United States Patent
Ito et al.

(10) Patent No.: US 11,965,556 B2
(45) Date of Patent: Apr. 23, 2024

(54) INDENTATION RESISTANCE MEASUREMENT METHOD, INDENTATION RESISTANCE PREDICTION METHOD FOR ROLLING BEARINGS, MACHINING CONDITION SELECTION METHOD, BEARING MATERIAL QUALITY SELECTION METHOD, BURNISHING CONDITION SELECTION METHOD, AND BEARING MANUFACTURING METHOD

(71) Applicant: NSK LTD., Tokyo (JP)

(72) Inventors: Hirofumi Ito, Fujisawa (JP); Takahito Shimada, Fujisawa (JP); Masahide Natori, Fujisawa (JP); Hideyuki Hidaka, Fujisawa (JP); Hayato Ishigami, Fujisawa (JP); Hiroki Komata, Fujisawa (JP)

(73) Assignee: NSK LTD., Tokyo (JP)

( * ) Notice: Subject to any disclaimer, the term of this patent is extended or adjusted under 35 U.S.C. 154(b) by 314 days.

(21) Appl. No.: 17/631,178

(22) PCT Filed: Apr. 7, 2021

(86) PCT No.: PCT/JP2021/014752
§ 371 (c)(1),
(2) Date: Jan. 28, 2022

(87) PCT Pub. No.: WO2021/220749
PCT Pub. Date: Nov. 4, 2021

(65) Prior Publication Data
US 2022/0268316 A1    Aug. 25, 2022

(30) Foreign Application Priority Data

Apr. 30, 2020  (JP) ................................. 2020-080615
Feb. 17, 2021  (JP) ................................. 2021-023516

(51) Int. Cl.
F16C 33/64    (2006.01)
F16C 19/06    (2006.01)
(Continued)

(52) U.S. Cl.
CPC .............. *F16C 33/64* (2013.01); *F16C 19/06* (2013.01); *F16C 33/62* (2013.01); *G01M 13/04* (2013.01); *G01N 3/40* (2013.01)

(58) Field of Classification Search
CPC .......... F16C 33/64; F16C 19/06; F16C 33/62; G01M 13/04; G01M 13/045; G01N 3/40; G01N 3/42
See application file for complete search history.

(56) References Cited

U.S. PATENT DOCUMENTS 7,577,555 B2 *  8/2009  Umeda .................... F16C 19/00
                                                  703/2
9,074,970 B2 *  7/2015  Lund ..................... G01M 13/04
(Continued)

FOREIGN PATENT DOCUMENTS

JP    2000-274440 A    10/2000
JP    2004-339575 A    12/2004
(Continued)

OTHER PUBLICATIONS

Office Action dated Aug. 31, 2021 by the Japanese Patent Office in counterpart Japanese Patent Application No. 2021-534918.
(Continued)

*Primary Examiner* — Freddie Kirkland, III
(74) *Attorney, Agent, or Firm* — Sughrue Mion, PLLC

(57) ABSTRACT

A method for measuring indentation resistance includes: obtaining a first curve indicating a yield shear stress in a depth direction of a raceway surface of a material forming a rolling bearing in a state before the raceway surface is subjected to machining, a second curve indicating a static
(Continued)

shear stress in the depth direction of the raceway surface in a state in which the raceway surface is subjected to the machining, and a third curve indicating a static shear stress in the depth direction of the raceway surface in a state in which rolling elements are in contact with the raceway surface and a static load is applied to the raceway surface; and obtaining a correlation between an area and an indentation depth of the raceway ring by defining a region surrounded by exceeding the first curve and the second curve and falling below the third curve as the area.

11 Claims, 5 Drawing Sheets

(51) Int. Cl.
  *F16C 33/62* (2006.01)
  *G01M 13/04* (2019.01)
  *G01N 3/40* (2006.01)

(56) References Cited

U.S. PATENT DOCUMENTS

| | | | |
|---|---|---|---|
| 9,234,826 B2* | 1/2016 | Matsubara | G01N 3/34 |
| 10,436,674 B2* | 10/2019 | Ito | G01M 13/04 |
| RE48,336 E | 12/2020 | Ueda et al. | |
| 2007/0044543 A1* | 3/2007 | Umeda | G01M 13/04 73/76 |
| 2009/0038713 A1 | 2/2009 | Ueda et al. | |
| 2013/0006542 A1* | 1/2013 | Matsubara | G01N 3/34 702/34 |

FOREIGN PATENT DOCUMENTS

| | | |
|---|---|---|
| JP | 2015-200351 A | 11/2015 |
| JP | 2016-114234 A | 6/2016 |
| JP | 2016-148393 A | 8/2016 |
| JP | 2018-119609 A | 8/2018 |
| WO | 2007/135929 A1 | 11/2007 |

OTHER PUBLICATIONS

International Search Report (PCT/ISA/210) dated Jun. 1, 2021 by the International Searching Authority in counterpart International Patent Application No. PCT/JP2021/014752.

Written Opinion (PCT/ISA/237) dated Jun. 1, 2021 by the International Searching Authority in counterpart International Patent Application No. PCT/JP2021/014752.

Futamura, Masaru, "High-speed Mirror Finishing Which Combine Fatigue Life Improvement and Sliding Wear Resistance Improvement-Roller Burnishing-", Journal of the Japan Society for Precision Engineering, 2015, vol. 81, No. 12, pp. 1053-1056. (26 pages total).

* cited by examiner

INDENTATION RESISTANCE MEASUREMENT METHOD, INDENTATION RESISTANCE PREDICTION METHOD FOR ROLLING BEARINGS, MACHINING CONDITION SELECTION METHOD, BEARING MATERIAL QUALITY SELECTION METHOD, BURNISHING CONDITION SELECTION METHOD, AND BEARING MANUFACTURING METHOD

CROSS-REFERENCE TO RELATED APPLICATIONS

This application is a National Phase Entry of PCT International Application No. PCT/JP2021/014752 filed Apr. 7, 2021, which claims priority to Japanese Patent Application No. 2020-080615 filed Apr. 30, 2020 and Japanese Patent Application No. 2021-023516 filed Feb. 17, 2021.

TECHNICAL FIELD

The present invention relates to an indentation resistance measurement method, an indentation resistance prediction method for rolling bearings, a machining condition selection method, a bearing material quality selection method, a burnishing condition selection method and a bearing manufacturing method.

BACKGROUND ART

In a rolling bearing, it is known that when an excessive load is received during rest, Hertz contact occurs between an outer ring raceway ring and an inner ring raceway ring of the rolling bearing and rolling elements, and permanent deformation (Brinell indentation) remains. When such an indentation exists, sound and vibration characteristics are affected during use of the rolling bearing. For example, in a rolling bearing for use in high-speed rotation such as a machine tool, even a minute indentation of about 1 μm causes a serious problem of abnormal noise and vibration. Therefore, when the rolling bearing is designed, a static limit load (basic static rated load) is determined by a contact stress, and in JISB 1519 (2009), for example, a contact stress of a radial ball bearing other than a thrust ball bearing and a self-aligning ball bearing is determined to be 4.2 GPa.

In addition, in order to reduce a size of the rolling bearing, which is a background of reduction in fuel consumption of an automobile or the like, plastic deformation resistance that can withstand an excessive load is required. In related art, in order to improve plastic deformation resistance of a rolling bearing, a balance between hardness of an outer ring raceway ring and an inner ring raceway ring of the rolling bearing and an amount of retained austenite is important. An attempt has been made to improve permanent deformation resistance by increasing the hardness of the raceway rings of the rolling bearing or reducing the retained austenite, which is a soft structure of steel, thereby improving indentation resistance.

For example, Patent Literature 1 discloses a technique in which a high carbon chromium bearing steel is subjected to carbonitriding treatment and tempering. Further, Patent Literature 2 discloses a technique in which raceway surfaces of inner and outer rings of a bearing is subjected to sub-zero treatment.

However, when attempting to improve the indentation resistance only by such heat treatment and component adjustment, special heat treatment such as the carbonitriding treatment and the sub-zero treatment takes a long time, and additionally requires steps therefor, resulting in an increase in manufacturing cost.

On the other hand, an indentation is formed as plastic deformation of the raceway surface, and can be considered as a simple yield phenomenon of a material. There are various methods for strengthening materials, and there are methods of work hardening in addition to the heat treatment and the component adjustment. The inventors have found that the indentation resistance can be further improved by performing machining on a material, such as quenched steel, that is hardened to a maximum extent by the heat treatment. There are various methods of machining, such as burnishing and shot peening, and these methods are also industrially implemented. In particular, the burnishing can prevent deterioration of surface properties caused by the shot peening or the like, and can prevent a removal at the time of finishing to be performed as necessary in a subsequent step.

CITATION LIST

Patent Literature

Patent Literature 1: JP-A-2015-200351
Patent Literature 2: JP-A-2000-274440

SUMMARY OF INVENTION

Technical Problem

However, in any case, it is difficult to predict what kind of machining is performed on what kind of bearing material to appropriately improve the indentation resistance of the rolling bearing, and therefore, it is necessary to perform many prototypes, evaluations, and studies. For this reason, it is necessary to prepare test pieces in which treatment conditions, machining conditions, alloy composition, and the like are variously changed and evaluate the test pieces each time, which requires cost and time.

The present invention has been made in view of the above problems, and an object of the present invention is to provide a method for measuring indentation resistance of a raceway ring of each of an outer ring and an inner ring when an outer ring raceway surface and an inner ring raceway surface are cured by machining without requiring the preparing work and the testing work of a test piece, a method for predicting indentation resistance of a rolling bearing, further to provide a method capable of selecting machining conditions and selecting bearing material quality after heat treatment, and a bearing manufacturing method.

Further, an object of the present invention is to provide a method for selecting optimum burnishing conditions for improving indentation resistance and a bearing manufacturing method, when a raceway surface of a bearing raceway ring such as an outer ring raceway surface or an inner ring raceway surface is cured by burnishing in verification based on calculation without requiring the preparing work and the testing work of the test piece.

Solution to Problem

An indentation in a rolling bearing is formed as plastic deformation caused by surface contact between rolling elements and a raceway ring. A stress that causes this plastic deformation is explained by a theory of Hertz contact. On the other hand, when a load exceeding a yield stress is applied to a metal, the plastic deformation occurs, and in order to continue the plastic deformation, a larger load is required, and a phenomenon referred to as "work hardening" occurs. In addition, when a work-hardened metal is once unloaded, the work-hardened metal is not deformed unless a load equal to or more than the yield stress is applied. When these phenomena are combined, if machining is performed in advance in accordance with a stress field of the Hertz contact generated between the rolling elements and the raceway ring, a region deformed by the contact between the rolling elements and the raceway ring will not be deformed a range thereof, and a difference therebetween will contribute to the formation of indentations.

That is, the deformation of the material can be explained based on the theory of Hertz contact, and if a calibration curve is experimentally created, a formation amount of the indentation generated by the added machining can be predicted only by geometric calculation. For example, when burnishing is performed as the machining, optimum machining conditions can be selected in consideration of a size of a burnishing ball mounted on a tip of a burnishing tool, a material forming the burnishing ball, a burnishing load, and the like at the time of prediction.

The present invention is based on such findings, and provides a method for measuring indentation resistance shown in (1) below in order to solve the above problems.

(1) A method for measuring indentation resistance of a rolling bearing in which a plurality of rolling elements are freely rollably held between raceway rings each having a raceway surface subjected to machining, the method includes:
   obtaining a first curve indicating a yield shear stress in a depth direction of the raceway surface of a material forming the rolling bearing in a state before the raceway surface is subjected to the machining,
   a second curve indicating a static shear stress in the depth direction of the raceway surface in a state in which the raceway surface is subjected to the machining, and
   a third curve indicating a static shear stress in the depth direction of the raceway surface in a state in which the rolling elements are in contact with the raceway surface and a static load is applied to the raceway surface; and
   obtaining a correlation between an area A and an indentation depth of the raceway ring by defining a region surrounded by exceeding the first curve and the second curve and falling below the third curve as the area A.

Further, in order to solve the above problems, the present invention provides a method for predicting indentation resistance of a rolling bearing shown in the following (2), a method for selecting machining conditions shown in the following (3), a method for selecting bearing material quality shown in the following (4), and a bearing manufacturing method shown in the following (5).

(2) A method for predicting indentation resistance of a rolling bearing, includes: predicting indentation resistance of the raceway ring based on the method for measuring indentation resistance according to (1).

(3) A method for selecting machining conditions using the method for predicting indentation resistance of a rolling bearing according to (2), includes:
   based on the correlation between the area A and the indentation depth of the raceway ring, obtaining the area A, so that the indentation resistance of the raceway ring has any size, obtaining the second curve so as to form the area A, and then determining machining conditions so as to form the second curve.

(4) A method for selecting bearing material quality using the method for predicting indentation resistance of a rolling bearing according to (2), includes:
   based on the correlation between the area A and the indentation depth of the raceway ring, obtaining the area A, so that the indentation resistance of the raceway ring has any size, obtaining the first curve so as to form the area A, and then determining bearing material quality after heat treatment so as to form the first curve.

(5) A bearing manufacturing method includes at least one step of the method for predicting indentation resistance of a rolling bearing according to (2), the method for selecting machining conditions according to (3), and the method for selecting bearing material quality according to (4).

In the present specification, the invention according to (1) to (5) described above is referred to as a "first invention group".

In order to solve the above problems, the present invention provides a method for selecting burnishing conditions as described in (6) to (10) below.

(6) A method for selecting machining conditions of burnishing to be performed on a raceway surface of a bearing raceway ring, includes:
   obtaining a first curve indicating a yield shear stress in a depth direction of the raceway surface of a material forming the bearing raceway ring in a state before the raceway surface is subjected to the burnishing,
   a second curve indicating a static shear stress in the depth direction of the raceway surface in a state in which the raceway surface is subjected to the burnishing, and
   a third curve indicating a static shear stress in the depth direction of the raceway surface in a state in which rolling elements are in contact with the raceway surface and a static load is applied to the raceway surface; and
   when a region surrounded by exceeding the first curve and the second curve and falling below the third curve is defined as an area A, and
   a region surrounded by exceeding the first curve and falling below the third curve is defined as an area S, selecting machining conditions satisfying the area A<the area S.

(7) In the method for selecting burnishing conditions according to (6),
   the burnishing is performed by using a burnishing tool of which a tip is mounted with a burnishing ball, and
   when a value obtained by dividing a radius of the burnishing ball by a groove radius of the bearing raceway ring is defined as a burnishing ball selection index B, B≤1.

(8) In the method for selecting burnishing conditions according to (7),
   a correlation is obtained between a burnishing indentation resistance index $\alpha$, which is expressed by (the area S−the area A)/the area S", and the burnishing ball selection index B.

(9) In the method for selecting burnishing conditions according to (8),
   based on the correlation between the burnishing indentation resistance index $\alpha$ and the burnishing ball selection index B, a size and a material of the burnishing ball and a burnishing load are determined, so that the burnishing indentation resistance index $\alpha$ is maximized.

(10) In the method for selecting burnishing conditions according to any one of (7) to (9),
   a material having a Young's modulus of 200 GPa or more is selected as the burnishing ball.

The present invention further provides a bearing manufacturing method described in (11) below.

(11) A bearing manufacturing method includes a burnishing step using the burnishing conditions selected by the method for selecting burnishing conditions according to any one of (6) to (10).

In the present specification, the invention according to (6) to (11) described above is referred to as a "second invention group".

Advantageous Effects of Invention

According to the present invention related to the above "first invention group", it is possible to measure indentation resistance of a bearing raceway ring, predict indentation resistance, select machining conditions, select bearing material quality after heat treatment, and manufacture a bearing excellent in indentation resistance without requiring preparing work and testing work of a test piece. Further, according to the present invention related to the "second invention group", it is possible to provide a method for selecting optimum machining conditions for improving indentation resistance and a bearing manufacturing method, when a raceway surface of a bearing raceway ring such as an outer ring raceway surface or an inner ring raceway surface is cured by burnishing in verification based on calculation without requiring the preparing work and the testing work of the test piece.

DESCRIPTION OF EMBODIMENTS

Hereinafter, embodiments of the present invention will be described in detail. However, the present invention is not limited to the following embodiments, and can be appropriately modified and applied without changing the gist of the present invention.

In the following embodiments, an embodiment for describing the present invention according to the "first invention group" is referred to as a "first embodiment", and an embodiment for describing the present invention according to the "second invention group" is referred to as a "second embodiment".

First Embodiment

First, the first embodiment will be described.

Figure 1:
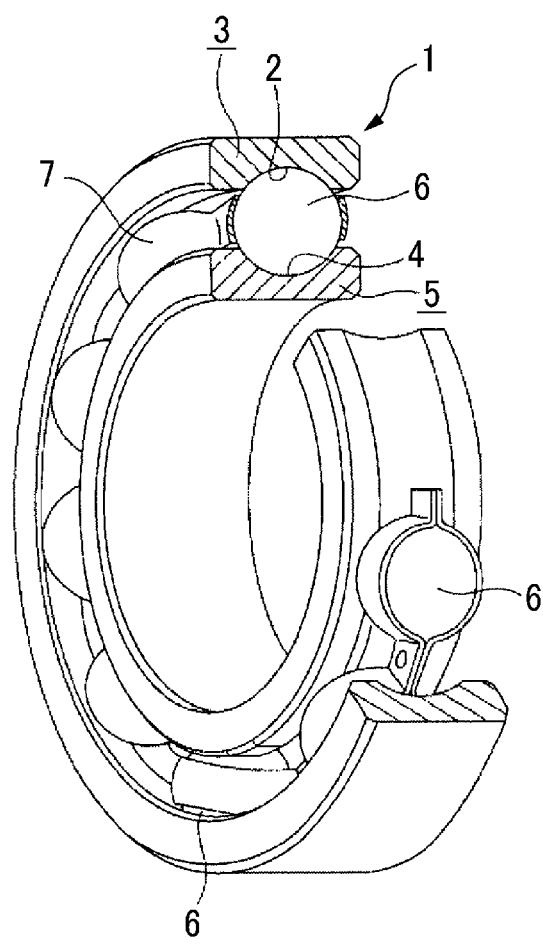
FIG. 1 is a partially cut-out perspective view showing a radial ball bearing as an example of a rolling bearing.

In the present invention, a type and configuration of a rolling bearing are not limited, and for example, a radial ball bearing shown in FIG. 1 can be shown. As shown in FIG. 1, the radial ball bearing 1 includes an outer ring 3 having an outer ring raceway surface 2 on an inner peripheral surface thereof, an inner ring 5 having an inner ring raceway surface 4 on an outer peripheral surface thereof, and a plurality of balls 6 provided between the outer ring raceway surface 2 and the inner ring raceway surface 4 and serving as rolling elements. The balls 6 are freely rollably held by a cage 7 in a state in which the balls 6 are disposed at equal intervals in a circumferential direction.

The outer ring raceway surface 2 and the inner ring raceway surface 4 are subjected to machining. The machining is not limited, and burnishing or shot peening is preferable.

The burnishing is a machining method in which a device, which is a machining jig and is provided with a component having a spherical tip and high hardness, is pressed against the outer ring raceway surface 2 and the inner ring raceway surface 4, and the outer ring 3 and the inner ring 5 are rotated around axes thereof to cause a compressive stress to act on the outer ring raceway surface 2 and the inner ring raceway surface 4. In addition, the shot peening is a machining method in which a shot material having a high hardness and a substantially spherical shape is projected onto the outer ring raceway surface 2 and the inner ring raceway surface 4. By adjusting processing conditions such as a size, a material, and a projection speed of the substantially spherical shot material, quality can be adjusted to be equivalent to that of burnishing.

Figure 2:
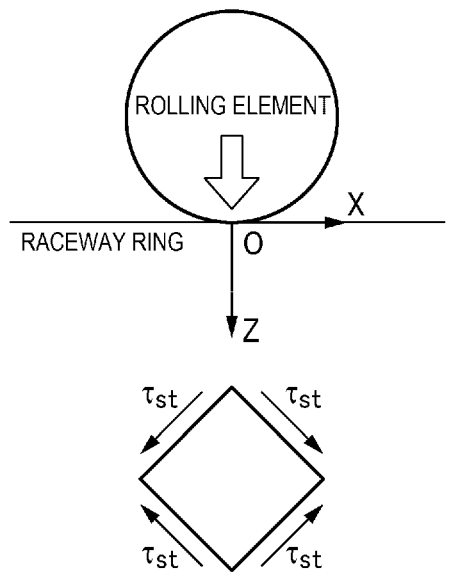
FIG. 2 is a schematic diagram for illustrating static shear stress.

In the rolling bearing, when a static load is applied, a raceway ring may be plastically deformed due to contact with the rolling element, and an indentation may be generated in the raceway surface. A deformation amount due to the plastic deformation is considered to be caused by a relative relationship between a static yield shear stress of a material forming the rolling bearing and a static shear stress generated inside the raceway ring due to Hertz contact between the rolling elements and the raceway ring. As shown in FIG. 2, the static shear stress is a static shear stress ($\tau_{st}$) acting on a contact point O between the raceway ring and the rolling element in directions of 45° with respect to a tangential direction of the rolling element.

Figure 3:
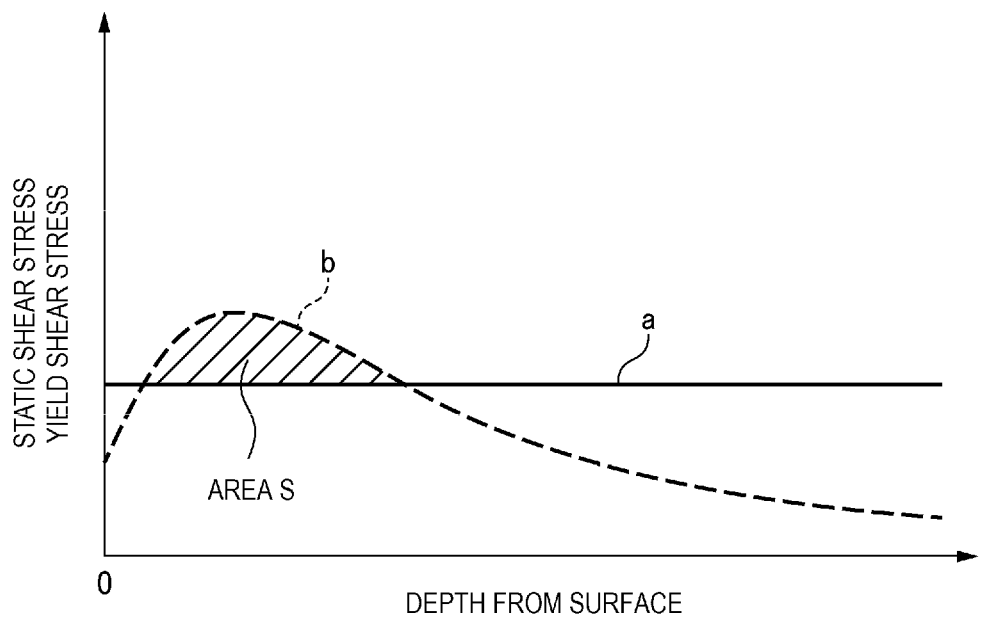
FIG. 3 is a schematic diagram for illustrating a method for calculating an area S.

FIG. 3 shows a "curve a" indicating the yield shear stress in a depth direction of the raceway surface of the material forming the rolling bearing, and a "curve b" indicating the static shear stress in the depth direction of the raceway surface that is generated inside the raceway ring when a predetermined static load is applied. As shown in FIG. 3, a region (hatched portion in the drawing) in which the static shear stress indicated by the curve b exceeds the yield shear stress of the material forming the rolling bearing indicated by the curve a is formed, and the amount of plastic deformation of the raceway surface can be estimated by a size of an "area S". It can be said that the smaller the area S is, the less likely the plastic deformation occurs, and the less the indentation is formed on the raceway surface. In FIG. 3, the "curve a" is indicated by a simple straight line for the sake of convenience, but is actually a substantially straight curve. The same applies to the "curve a" in FIG. 4 to be described below.

Similarly, when the raceway surface is subjected to the machining, the machining jig (the component having the spherical tip in the case of burnishing, and the shot material having the substantially spherical shape in the case of shot peening) and the raceway surface come into contact with each other, and thus, it can be considered that the machining jig and the raceway surface come into the Hertz contact. In addition, it can be considered that the static shear stress exceeding the yield shear stress of the material forming the rolling bearing is introduced in advance before the static load is applied.

Figure 4:
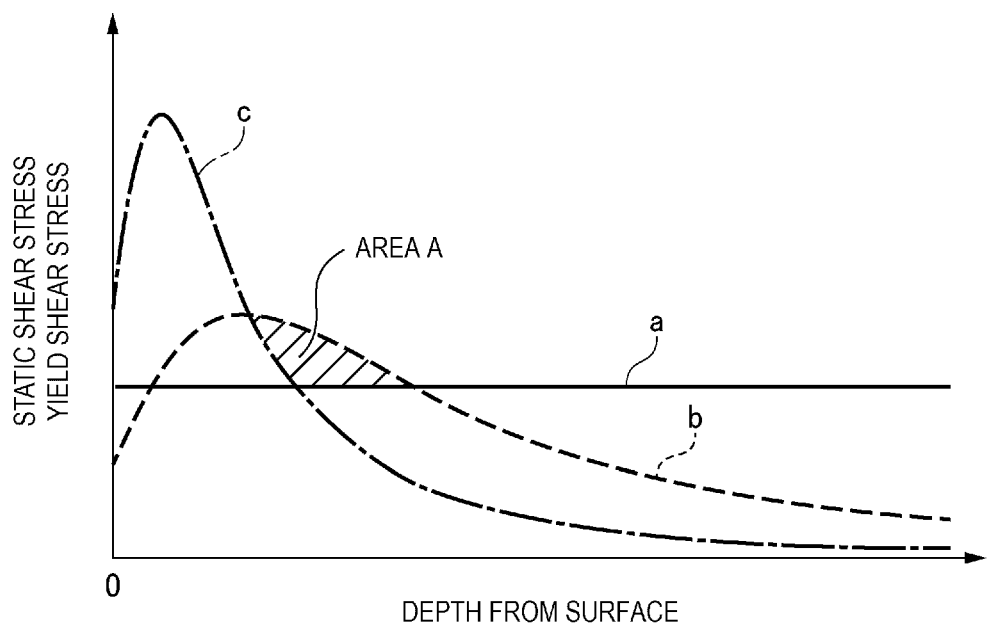
FIG. 4 is a schematic diagram for illustrating a method for calculating an area A.

FIG. 4 collectively shows the "curve a" (first curve) indicating the yield shear stress in the depth direction of the raceway surface of the material forming the rolling bearing in a state before the machining is performed on the raceway surface, a "curve c" (second curve) indicating static shear stress in the depth direction of the raceway surface when the machining is performed under a predetermined condition, that is, in a state in which the machining is performed on the raceway surface, and the "curve b" (third curve) indicating the static shear stress in the depth direction of the raceway surface when the predetermined static load is applied, that is, in a state in which the rolling elements are in contact with the raceway surface and the static load is applied.

In FIG. 4, indentation resistance of the raceway ring obtained from machining conditions can be predicted based on an "area A" (plastic deformation index) of a region (hatched portion in the drawing) surrounded by exceeding the curve a (first curve) and the curve c (second curve) and falling below the curve b (third curve). Each curve can be obtained by the following calculation.

The static shear stress $\tau_{st}$ generated inside the raceway ring is expressed by the following equation (1), in which $\sigma_x$ (unit MPa) is a vertical stress generated with respect to the tangential direction of the rolling element and $\sigma_z$ (unit MPa) is a vertical stress generated with respect to a normal direction at a contact point between the raceway ring and the rolling element, and can be calculated using a known elastic theoretical solution.

[Equation 1]

$$\tau_{st} = \frac{\sigma_x - \sigma_z}{2} \quad (1)$$

When the vertical stresses $\sigma_x$ and $\sigma_z$ are in point contact, the vertical stresses $\sigma_x$ and $\sigma_z$ can be calculated using, for example, an elastic theoretical solution of Hanson (Hanson, M. T. and Johnson, T., "The Elastic Field for Spherical HertzianContact of Isotropic Bodies Revisited: Some Alternative Expressions", Transactions of the ASME, Journal of Tribology, Vol. 115 (1993), pp. 327-332). By using a maximum contact surface pressure $q_{max}$ of the Hertz contact, a contact surface radius a, and a Poisson's ratio v, $\sigma_x$ and $\sigma_z$ are expressed by the following equations (2) to (7).

[Equation 2]

$$\sigma_x = \frac{\sigma_1 + \sigma_2}{2} \quad (2)$$

[Equation 3]

$$\sigma_z = -\frac{q_{max}}{a} \frac{(a^2 - l_1^2)^{3/2}}{l_2^2 - l_1^2} \quad (3)$$

[Equation 4]

$$\sigma_1 = \frac{q_{max}}{a} \left\{ 2(1+v)z\sin^{-1}\frac{l_1}{r} - (1+2v)\sqrt{a^2 - l_1^2} - \frac{za\sqrt{l_2^2 - a^2}}{l_2^2 - l_1^2} \right\} \quad (4)$$

[Equation 5]

$$\sigma_2 = \frac{q_{max}}{3a} \frac{e^{2i\theta}}{r^2} \times \left\{ -\frac{3zl_1^3 a\sqrt{x^2 - l_1^2}}{l_2^2 - l_1^2} + (1-2v)\left[2a^3 - (l_1^2 + 2a^2)\sqrt{a^2 - l_1^2}\right] \right\} \quad (5)$$

[Equation 6]

$$l_1 = \frac{1}{2}\left\{\sqrt{(r+a)^2 + z^2} - \sqrt{(r-a)^2 + z^2}\right\} \quad (6)$$

[Equation 7]

$$l_2 = \frac{1}{2}\left\{\sqrt{(r+a)^2 + z^2} + \sqrt{(r-a)^2 + z^2}\right\} \quad (7)$$

Here, $x = r\cos\theta$ ($r > 0$), when $x > 0$, $\theta = 0$, and when $x < 0$, $\theta = \pi$. The maximum contact surface pressure $q_{max}$ of the Hertz contact and the contact surface radius a can be calculated with reference to, for example, "Ball Bearing Design Calculation Guide" (Junzou Okamoto, 2011). When the vertical stresses $\sigma_x$ and $\sigma_z$ are in line contact, the vertical stresses $\sigma_x$ and $\sigma_z$ can be calculated by using, for example, an elastic theoretical solution of Smith (Smith, J. O., Liu, C. K. and Ill U., "Stress Due to Tangential and Normal Loads on an Elastic Solid With Application to Some Contact Stress Problems", Transaction of the ASME, Journal of Applied Mechanics, Vol. 20 (1953), pp. 157-166), or a calculation formula of Tanaka (Chokkou Tanaka, "Calculation of Internal Stress of Elliptic Contact", TRANSACTIONS OF THE JAPAN SOCIETY OF MECHANICAL ENGINEERS Series C, Vol. 61, No. 660 (2001), pp. 265-269).

A yield shear stress $\tau_y$ (unit MPa) of the material forming the rolling bearing is expressed by the following equation (8), in which a 0.2% proof stress is $\sigma_{0.2}$ and a Vickers hardness of the raceway ring is HV.

[Equation 8]

$$\tau_y = \cos 45° \cdot \sin 45° \times \sigma_{0.2} = \frac{1}{2} \times 0.3 \times HV \times 9.8 \quad (8)$$

Then, each curve is calculated based on the above equations, and a difference among the curve a, the curve b, and the curve c at the same depth from the surface is integrated in the depth direction from the surface, so that the area A can be obtained.

In addition, in order to facilitate the calculation, the calculation can be approximately performed by using a sectional measurement method. That is, the rolling element is divided into a plurality of minute sections $\Delta Z$ in the normal direction of the rolling element with reference to the contact point between the raceway ring and the rolling element, and areas of these minute sections may be added. For more accurate calculation, it is desirable to reduce the minute section $\Delta Z$, and 0.01 mm is appropriate. Even when the minute section $\Delta Z$ is smaller than 0.01 mm, a difference among the calculated areas A is negligibly small.

The present invention relates to a method for measuring an indentation formation amount and a method for predicting the indentation formation amount that are applied to a case in which a metal is subjected to machining by a theory of the Hertz contact such as roller burnishing, and a deformation theory such as a rolling bearing is caused by the Hertz contact, and the present invention is intended to select machining conditions for controlling the indentation formation amount and the bearing material quality after heat treatment.

Examples According to First Embodiment

Hereinafter, effects of the present invention according to the first invention group will be specifically described with reference to examples and comparative examples, but the present invention is not limited thereto. It was found that the area A obtained as described above has a high correlation with an indentation depth of the raceway surface as shown below.

(Preparation of Test Piece)

A steel ball was pressed against a flat plate-shaped test piece simulating the raceway ring of the rolling bearing, and a depth of an indentation generated on a surface of the test piece was measured. Each test piece was made of bearing steel (SUJ2 steel) and was subjected to quenching and tempering. In Example 1, quenching at 840° C. and tempering at 180° C. were performed, and in Example 2, quenching at 840° C. and tempering at 300° C. were performed. After flat finishing was performed, burnishing was performed in Examples 1 and 2. In Comparative Example 1, the quenching at 840° C. and the tempering at 180° C. were performed, and in Comparative Example 2, the quenching at 840° C. and the tempering at 300° C. were performed. Thereafter, in Comparative Examples 1 and 2, the burnishing was not performed, and only the flat finishing was performed. The burnishing conditions were as follows: a tip shape of a burnishing tool was φ3 mm, a slip rate was 100%, a peripheral speed was 100 m/min, a tool feed speed was 0.05 mm/rev, and a tool pushing amount was 0.3 mm. At the time of machining, a filtered working fluid was used, and the maximum contact surface pressure was calculated on an assumption that only elastic deformation occurred, and a burnishing load was set to 9.2 GPa.

(Indentation Test)

In an indentation test, similarly to the test piece having a flat plate-shaped and simulating the raceway ring of the rolling bearing, a bearing steel was prepared, a steel ball in ⅜ inch subjected to quenching and tempering was used, a load was applied to the test piece so that the maximum contact surface pressure of the test piece became 5.0 GPa, 5.5 GPa, and 6.0 GPa, and then a depth of an indentation generated on the surface of the test piece was measured by using a three-dimensional surface texture measuring machine (CCI) manufactured by Taylor Hobson Ltd. Table 1 shows results of the indentation test and the calculation results of the area A. The results of Example 1 and Comparative Example 1 were compared, the results of Example 2 and Comparative Example 2 were compared, and it was confirmed that the indentation depth was reduced by being subjected to the burnishing.

Figure 5:
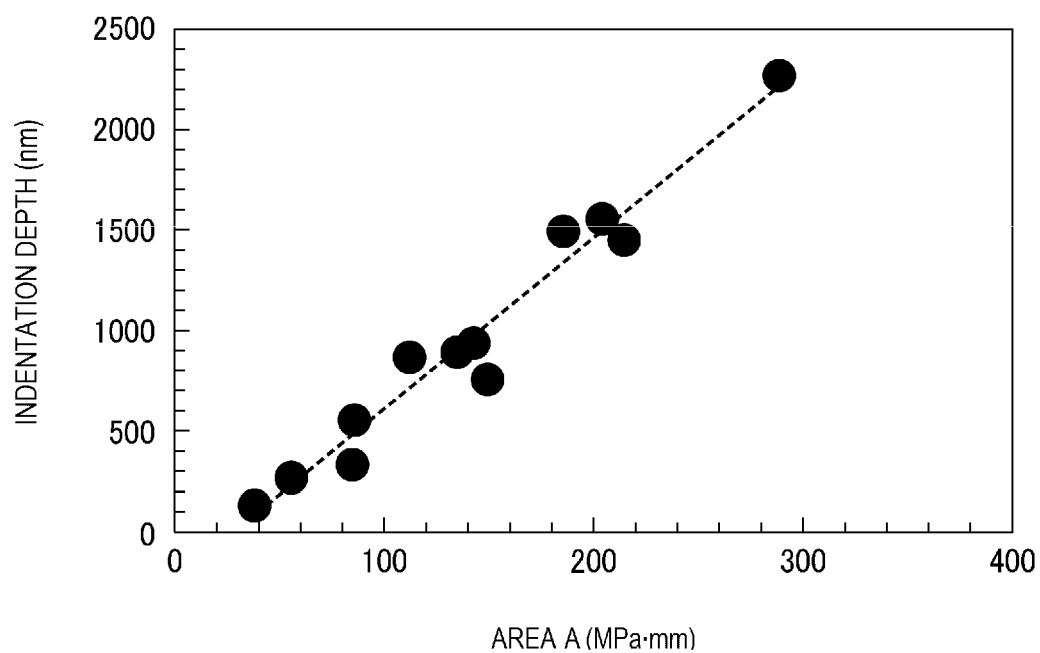
FIG. 5 is a graph showing a relationship between the area A and an indentation depth of a raceway ring for illustrating the present invention according to a first invention group in a first embodiment.

FIG. 5 is a graph showing a relationship between the area A and the indentation depth of the raceway ring. As shown in FIG. 5, a good correlation was observed between the calculated area A and the measured indentation depth.

As described above, since the indentation depth can be predicted as long as the area A can be calculated, it is not necessary to perform a test for evaluating indentation resistance every time the test piece is prepared, and indentation resistance of the bearing raceway ring after being subjected to the machining can be predicted, so that a bearing having excellent indentation resistance can be provided.

Further, based on the correlation between the area A and the indentation depth of the raceway ring, the area A can be obtained, so that the indentation resistance of the raceway ring has any size, the second curve can be obtained so as to form the area A, and then the machining conditions can be determined so as to form the second curve.

Further, based on the correlation between the area A and the indentation depth of the raceway ring, the area A can be obtained, so that the indentation resistance of the raceway ring has any size, the first curve can be obtained, so as to form the area A, and then, the bearing material quality after the heat treatment can be determined so as to form the first curve.

Furthermore, a bearing having excellent indentation resistance can be manufactured by a bearing manufacturing method including at least one step among the above-described method for predicting indentation resistance of a rolling bearing, the method for selecting machining conditions, and the method for selecting bearing material quality.

TABLE 1

| Surface Pressure (Gpa) | Example 1 | | Comparative Example 1 | | Example 2 | | Comparative Example 2 | |
| --- | --- | --- | --- | --- | --- | --- | --- | --- |
| | Depth (nm) | Area A (Mpa · mm) | Depth (nm) | Area A (Mpa · mm) | Depth (nm) | Area A (Mpa · mm) | Depth (nm) | Area A (Mpa · mm) |
| 5.0 | 132 | 37 | 558 | 85 | 269 | 58 | 892 | 134 |
| 5.5 | 332 | 82 | 935 | 143 | 874 | 114 | 1565 | 203 |
| 6.0 | 765 | 144 | 1460 | 215 | 1500 | 188 | 2280 | 288 |

Second Embodiment

Next, a second embodiment will be described.

In the second embodiment, a type and configuration of a rolling bearing are not limited, and for example, the radial ball bearing shown in FIG. 1 can be shown. The outer ring raceway surface 2 and the inner ring raceway surface 4 are subjected to burnishing as the machining.

When the raceway surface is subjected to the burnishing, a tip of a burnishing tool that has a spherical shape and the raceway surface come into contact with each other, and thus, it can be considered that the burnishing tool and the raceway surface come into the Hertz contact. In addition, it can be considered that a shear stress exceeding the yield shear stress of the material forming the rolling bearing is introduced in advance before the static load is applied. Therefore, as described with reference to FIG. 3, in the "curve a" indicating the yield shear stress in the depth direction of the raceway surface of the material forming the rolling bearing and the "curve b" indicating the static shear stress in the depth direction of the raceway surface generated inside the raceway ring when the predetermined static load is applied, the amount of plastic deformation of the raceway surface can be estimated by the size of the "area S" of the region in which the static shear stress indicated by the curve b exceeds the yield shear stress of the material forming the rolling bearing indicated by the curve a. It can be said that the smaller the area S is, the less likely the plastic deformation occurs, and the less the indentation is formed on the raceway surface.

Further, as described with reference to FIG. 4, indentation resistance of the raceway ring obtained from burnishing conditions can be predicted based on the "area A" (plastic deformation index) of the region (hatched portion in the drawing) surrounded by exceeding the curve a (first curve) and the curve c (second curve) and falling below the curve b (third curve).

Each curve can be obtained by the above equations (1) to (8).

Then, each curve is calculated based on the above equations, and a difference among the curve a, the curve b, and the curve c at the same depth from the surface is integrated in the depth direction from the surface, so that the area S or the area A can be obtained.

In addition, in order to facilitate the calculation, the calculation can be approximately performed by using a sectional measurement method. That is, the rolling element is divided into a plurality of minute sections $\Delta Z$ in the normal direction of the rolling element with reference to the contact point between the raceway ring and the rolling element, and areas of these minute sections may be added. For more accurate calculation, it is desirable to reduce the minute section $\Delta Z$, and 0.01 mm is appropriate. Even when the minute section $\Delta Z$ is smaller than 0.01 mm, a difference among the calculated areas A or areas S is negligibly small.

In order to improve the indentation resistance of the bearing raceway ring by burnishing, when the region surrounded by exceeding the curve a and the curve c and falling below the curve b is defined as the area A and the region surrounded by exceeding the curve a and falling below the curve b is defined as the area S, "area A<area S" is required. When the area A is equal to the area S, hardening due to the burnishing is insufficient, and this does not contribute to the improvement of the indentation resistance.

In order to perform burnishing on the raceway surface of the bearing raceway ring, when a value obtained by dividing a radius of a burnishing ball, which is a burnishing tool, by a groove radius of the bearing raceway ring is defined as a burnishing ball selection index B, it is required that B≤1. When B>1, a ball at the tip of the burnishing tool cannot be inserted into a groove of the bearing raceway ring, and the desired burnishing cannot be performed.

Figure 6:
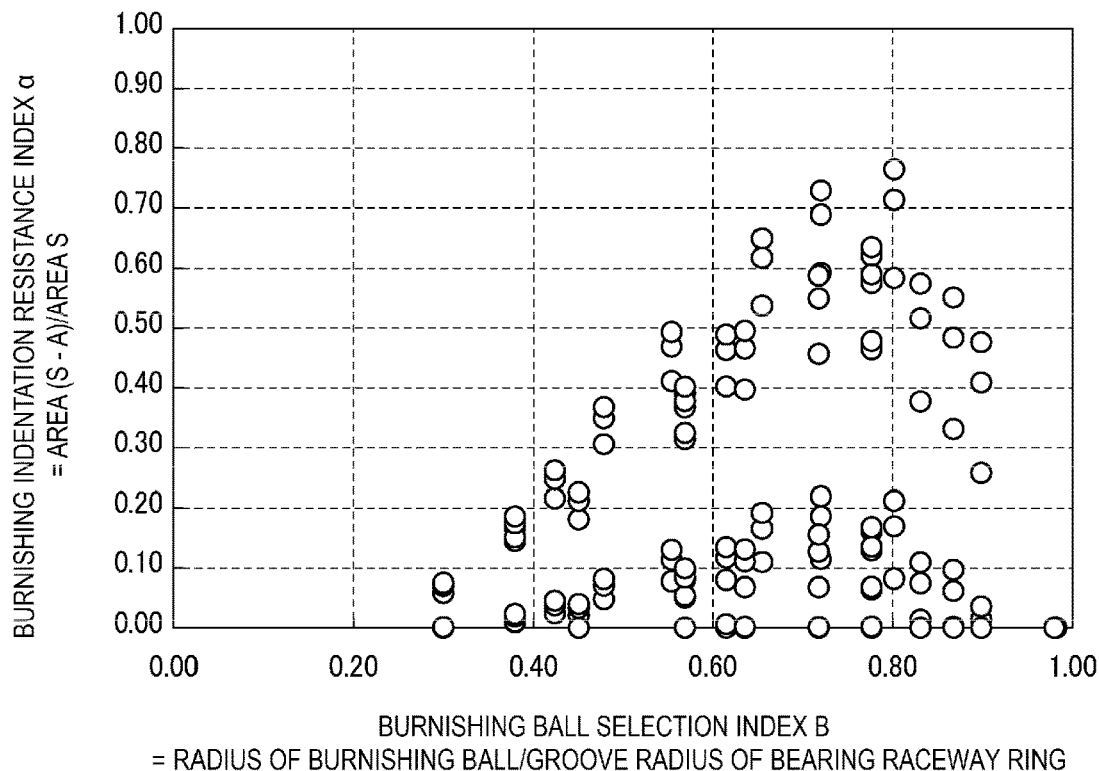
FIG. 6 is a graph showing a correlation between a burnishing ball selection index B and a burnishing indentation resistance index $\alpha$ when a burnishing tool, a material of the ball, and a burnishing load are changed, for illustrating the present invention according to a second invention group in a second embodiment.
Figure 7:
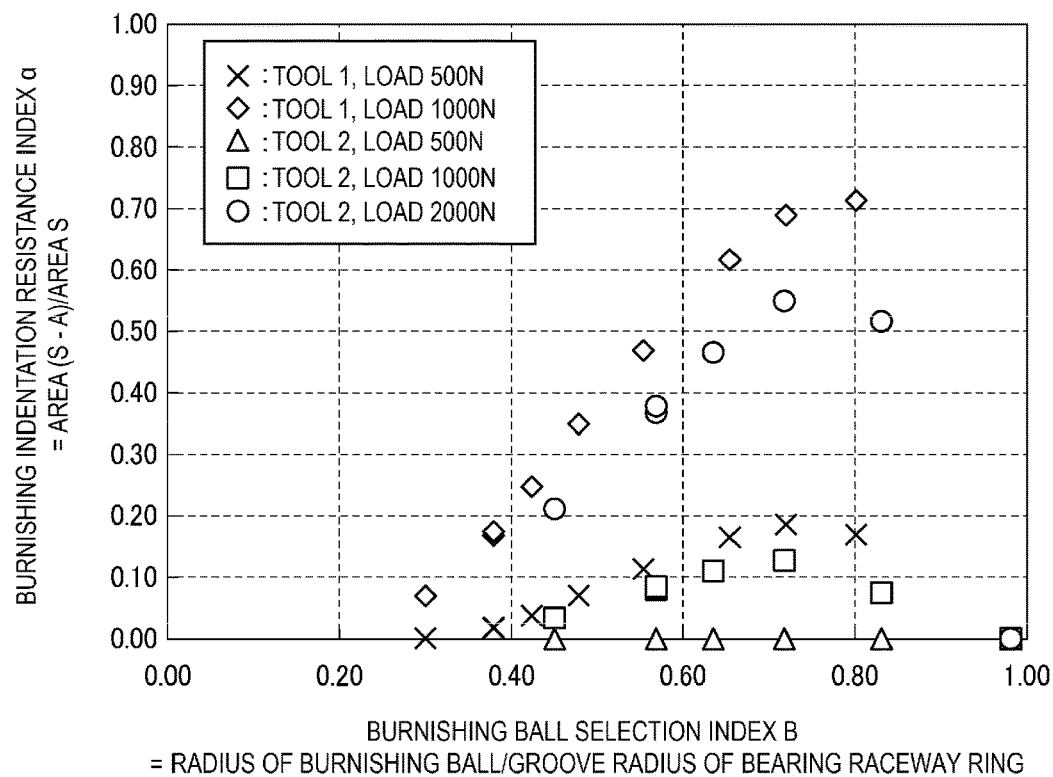
FIG. 7 is a graph showing a relationship between the burnishing ball selection index B and the burnishing indentation resistance index $\alpha$ when the burnishing load is changed, for illustrating the present invention according to the second invention group in the second embodiment.
Figure 8:
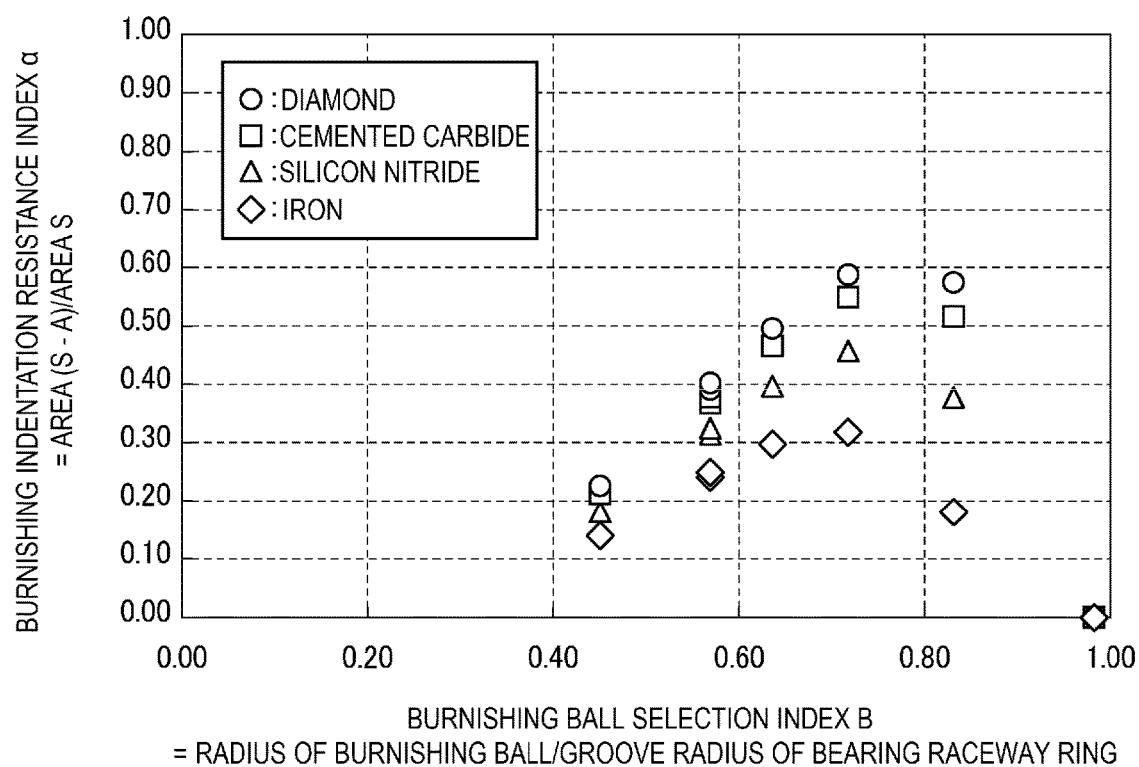
FIG. 8 is a graph showing a relationship between the burnishing ball selection index B and the burnishing indentation resistance index $\alpha$ when the material of the burnishing ball is changed, for illustrating the present invention according to the second invention group in the second embodiment.

When a value obtained by dividing a value obtained by subtracting the area A from the area S by the area S, that is, "(area S−area A)/area S" is defined as a burnishing indentation resistance index $\alpha$, a correlation is observed between the burnishing indentation resistance index $\alpha$ and the burnishing ball selection index B as shown in Examples described later. Then, as shown in FIGS. 6 to 8 to be described later, when an xy coordinates is adopted in which the burnishing ball selection index B is "x" (horizontal axis) and the burnishing indentation resistance index $\alpha$ is "y" (vertical axis), as the burnishing indentation resistance index $\alpha$ increases, the indentation resistance of the bearing raceway ring subjected to the burnishing is more effectively improved.

That is, it is preferable to determine a size of the burnishing ball, that is, a radius of the burnishing ball, a material of the burnishing ball, and the burnishing load such that the burnishing indentation resistance index $\alpha$ is maximized at the xy coordinates.

Further, the material of the burnishing ball affects the burnishing conditions. Here, as shown in Examples to be described later, a correlation is observed between a Young's modulus and indentation resistance of the burnishing ball, and the larger the Young's modulus of the material is, the larger the burnishing indentation resistance index $\alpha$ is.

Specifically, it is preferable to select a material having a Young's modulus equal to or higher than a Young's modulus of iron (Young's modulus: 200 GPa), for example, silicon nitride (Young's modulus: 320 GPa) is preferable, a material referred to as cemented carbide such as tungsten carbide (Young's modulus: 550 GPa), diamond (Young's modulus: 786 GPa), or the like is more preferable.

As described above, depending on the ball size of the burnishing tool, the material forming the ball, and the burnishing load to be applied, the indentation resistance of the bearing raceway ring that is subjected to the burnishing greatly differs. Therefore, as in the present invention, as long as the size and material of the burnishing ball and the burnishing load are determined to maximize the burnishing indentation resistance index $\alpha$ based on the correlation between the burnishing ball selection index B and the burnishing indentation resistance index $\alpha$, it is possible to select optimum burnishing conditions for improving the indentation resistance of the bearing raceway ring without requiring preparing work and testing work of the test piece.

The present invention according to the "second invention group" provides a bearing manufacturing method for a rolling bearing, including a burnishing step of performing burnishing on an inner ring raceway surface or an outer ring raceway surface under the optimum machining conditions selected as described above. Steps other than the burnishing step can be appropriately performed according to a manufacturing method in the related art.

Examples According to Second Embodiment

An influence of the selection of the machining conditions for burnishing (tool selection) on the indentation resistance of the bearing raceway ring was verified based on calculation. Hereinafter, effects of the present invention according to the second invention group will be specifically described with reference to verification examples, but the present invention is not limited thereto.

The indentation resistance when the burnishing was performed on various bearing raceway rings was verified. Target bearings are angular ball bearing inner rings, and a main bearing shape is shown in Table 2. A material of the target bearings is carbonitrided steel, and the rolling elements are ceramics. In Table 2, "PCD" is a pitch circle diameter of the rolling elements.

TABLE 2

| Bearing Number | Inner Diameter of Inner Ring (mm) | Groove Radius of Inner Ring (mm) | Diameter of Rolling Element (mm) | PCD (mm) | Contact Angle (deg) |
|---|---|---|---|---|---|
| Bearing 1 | 30 | 4.0 | 7.1 | 43 | 18 |
| Bearing 2 | 40 | 4.4 | 7.9 | 54 | 18 |
| Bearing 3 | 50 | 4.9 | 8.7 | 65 | 18 |

TABLE 2-continued

| Bearing Number | Inner Diameter of Inner Ring (mm) | Groove Radius of Inner Ring (mm) | Diameter of Rolling Element (mm) | PCD (mm) | Contact Angle (deg) |
|---|---|---|---|---|---|
| Bearing 4 | 60 | 5.7 | 10.3 | 78 | 18 |
| Bearing 5 | 70 | 6.6 | 11.9 | 90 | 18 |
| Bearing 6 | 80 | 7.5 | 13.5 | 103 | 18 |
| Bearing 7 | 90 | 8.4 | 15.1 | 115 | 18 |
| Bearing 8 | 100 | 8.4 | 15.1 | 125 | 18 |
| Bearing 9 | 110 | 10.6 | 19.1 | 140 | 18 |

The burnishing tools used in this verification are shown in Table 3. For each tool, the size of the ball at the tip and the burnishing load that can be applied are different. The material of the ball was any one of silicon nitride (Young's modulus: 320 GPa, Poisson's ratio: 0.26), tungsten carbide (Young's modulus: 550 GPa, Poisson's ratio: 0.22) which is a cemented carbide, and diamond (Young's modulus: 786 GPa, Poisson's ratio: 0.2).

TABLE 3

| Burnishing Tool Number | Ball Diameter (mm) | Ball Material | Burnishing Load (N) |
|---|---|---|---|
| Tool 1 | 6.4 | Silicon Nitride, Cemented Carbide, Diamond | 500, 1000 |
| Tool 2 | 9.5 | Silicon Nitride, Cemented Carbide, Diamond | 500, 1000, 2000 |
| Tool 3 | 13.0 | Silicon Nitride, Cemented Carbide, Diamond | 500, 1000, 2000, 4000 |
| Tool 4 | 19.0 | Silicon Nitride, Cemented Carbide, Diamond | 500, 1000, 2000, 4000, 9000 |

Table 4 summarizes the burnishing ball selection index B of each bearing for each burnishing tool. In order to perform the burnishing on the raceway surface of the bearing, it is necessary that at least the burnishing ball selection index B≤1. As described above, when the burnishing ball selection index B>1, the ball at the tip of the burnishing tool cannot be inserted into the groove of the bearing raceway ring, and the desired burnishing cannot be performed. Therefore, in Table 4, "-" is shown when the burnishing ball selection index B>1.

TABLE 4

| | | Burnishing Tool Number | | | |
|---|---|---|---|---|---|
| | | Tool 1 | Tool 2 | Tool 3 | Tool 4 |
| Bearing Number | Bearing 1 | 0.80 | — | — | — |
| | Bearing 2 | 0.72 | — | — | — |
| | Bearing 3 | 0.65 | 0.98 | — | — |
| | Bearing 4 | 0.55 | 0.83 | — | — |
| | Bearing 5 | 0.48 | 0.72 | 0.98 | — |
| | Bearing 6 | 0.42 | 0.64 | 0.87 | — |
| | Bearing 7 | 0.38 | 0.57 | 0.78 | — |
| | Bearing 8 | 0.38 | 0.57 | 0.78 | — |
| | Bearing 9 | 0.30 | 0.45 | 0.61 | 0.90 |

Then, assuming that the rolling element was brought into contact with the raceway surface of the bearing and a static load of 4.6 GPa was applied as the maximum contact surface pressure, the curve a, the curve b, and the curve c were respectively obtained, and the area A and the area S were calculated. In Table 4, among combinations of the bearing and the tool in which "-" is not shown, "Area A<Area S" can be satisfied by appropriately selecting the material of the burnishing ball and the burnishing load, as will be described later.

Subsequently, based on the area A and the area S, the burnishing indentation resistance index α, which is "(area S−area A)/area S", was calculated, and the correlation with the burnishing ball selection index B was examined. FIG. 6 is a graph showing the xy coordinates in which the burnishing ball selection index B is "x" (horizontal axis) and the burnishing indentation resistance index α is "y" (vertical axis) when the burnishing tool, the material of the ball, and the burnishing load are changed. As shown in FIG. 6, the correlation is observed between the burnishing indentation resistance index α and the burnishing ball selection index B, as the burnishing ball selection index B increases, the burnishing indentation resistance index α increases, and when the burnishing ball selection index B is equal to or greater than a certain value, the burnishing indentation resistance index α decreases. As described above, it can be said that an optimum ball size of the burnishing tool exists in accordance with the groove radius of the bearing raceway ring depending on the verification based on the calculation.

Next, FIG. 7 shows the relationship between the burnishing ball selection index B and the burnishing indentation resistance index α when the burnishing load is changed in the verification using a burnishing tool 1 or 2 of which a material of a burnishing ball is cemented carbide. As shown in FIG. 7, it was confirmed by the verification based on the calculation that the larger the burnishing load is, the further the indentation resistance of the bearing raceway ring is improved. Although the smaller the burnishing balls are, the better the indentation resistance of the bearing raceway ring is, since the maximum burnishing load that can be applied is limited in consideration of durability of the balls when the burnishing tool is actually used, it is necessary to select a desired burnishing tool from the optimum combinations of the ball size and the burnishing load.

FIG. 8 shows the relationship between the burnishing ball selection index B and the burnishing indentation resistance index α when the material of the burnishing ball is changed in the verification for the bearings 3 to 9 under the burnishing load of 2000 N using the burnishing tool 2. In this verification (verification based on the calculation), as the material of the burnishing ball, iron (Young's modulus: 200 GPa, Poisson's ratio: 0.28) was added in addition to silicon nitride (Young's modulus: 320 GPa, Poisson's ratio: 0.26), tungsten carbide (Young's modulus: 550 GPa, Poisson's ratio: 0.22) which is cemented carbide, and diamond (Young's modulus: 786 GPa, Poisson's ratio: 0.2) as described above, and the verification was performed.

As shown in FIG. 8, it was confirmed that the indentation resistance was improved in an order of iron, silicon nitride, cemented carbide (tungsten carbide), and diamond as the material of the burnishing ball, that is, the indentation resistance was improved as the Young's modulus was higher. In addition, in this verification, it was confirmed that as long as the burnishing ball was formed of a material having a Young's modulus equal to or greater than 200 GPa of iron, the indentation resistance of the bearing raceway ring was improved.

As described above, depending on the size of the burnishing ball, which is the burnishing tool, the material forming the ball, and the burnishing load to be applied, the indentation resistance of the bearing raceway ring that is subjected to the burnishing greatly differs. Therefore, as in the present invention, as long as the size and material of the burnishing ball and the burnishing load are determined to maximize the burnishing indentation resistance index α based on the correlation between the burnishing ball selection index B and the burnishing indentation resistance index α, it is possible to obtain optimum machining conditions for burnishing (tool selection) for improving the indentation resistance of the bearing raceway ring without requiring the preparing work and the testing work of the test piece.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on a Japanese patent application (Japanese Patent Application No. 2020-080615) filed on Apr. 30, 2020 and a Japanese patent application (Japanese Patent Application No. 2021-023516) filed on Feb. 17, 2021, the contents of which are incorporated herein by reference.

REFERENCE SIGNS LIST 1 radial ball bearing
2 outer ring raceway surface
3 outer ring
4 inner ring raceway surface
5 inner ring
6 ball
7 cage

The invention claimed is:

1. A method for measuring indentation resistance of a rolling bearing in which a plurality of rolling elements are freely rollably held between raceway rings each having a raceway surface subjected to machining, the method comprising:
obtaining a first curve indicating a yield shear stress in a depth direction of the raceway surface of a material forming the rolling bearing in a state before the raceway surface is subjected to the machining,
a second curve indicating a static shear stress in the depth direction of the raceway surface in a state in which the raceway surface is subjected to the machining, and
a third curve indicating a static shear stress in the depth direction of the raceway surface in a state in which the rolling elements are in contact with the raceway surface and a static load is applied to the raceway surface; and
obtaining a correlation between an area A and an indentation depth of the raceway ring by defining a region surrounded by exceeding the first curve and the second curve and falling below the third curve as the area A.

2. A method for predicting indentation resistance of a rolling bearing, comprising:
predicting indentation resistance of the raceway ring based on the method for measuring indentation resistance according to claim 1.

3. A method for selecting machining conditions using the method for predicting indentation resistance of a rolling bearing according to claim 2, comprising:
based on the correlation between the area A and the indentation depth of the raceway ring, obtaining the area A, so that the indentation resistance of the raceway ring has any size, obtaining the second curve so as to form the area A, and then determining machining conditions so as to form the second curve.

4. A method for selecting bearing material quality using the method for predicting indentation resistance of a rolling bearing according to claim 2, comprising:
based on the correlation between the area A and the indentation depth of the raceway ring, obtaining the area A, so that the indentation resistance of the raceway ring has any size, obtaining the first curve so as to form the area A, and then determining bearing material quality after heat treatment so as to form the first curve.

5. A bearing manufacturing method comprising:
at least one step of a method for predicting indentation resistance of a rolling bearing, a method for selecting machining conditions, and a method for selecting bearing material quality, wherein
the method for predicting indentation resistance of the rolling bearing comprising:
predicting indentation resistance of the raceway ring based on the method for measuring indentation resistance according to claim 1,
the method for selecting machining conditions uses the method for predicting indentation resistance of the rolling bearing, and the method for selecting machining conditions comprising:
based on the correlation between the area A and the indentation depth of the raceway ring, obtaining the area A, so that the indentation resistance of the raceway ring has any size, obtaining the second curve so as to form the area A, and then determining machining conditions so as to form the second curve, and
the method for selecting bearing material quality uses the method for predicting indentation resistance of a rolling bearing, and the method for selecting bearing material quality comprising:
based on the correlation between the area A and the indentation depth of the raceway ring, obtaining the area A, so that the indentation resistance of the raceway ring has any size, obtaining the first curve so as to form the area A, and then determining bearing material quality after heat treatment so as to form the first curve.

6. A method for selecting machining conditions of burnishing to be performed on a raceway surface of a bearing raceway ring, comprising:
obtaining a first curve indicating a yield shear stress in a depth direction of the raceway surface of a material forming the bearing raceway ring in a state before the raceway surface is subjected to the burnishing,
a second curve indicating a static shear stress in the depth direction of the raceway surface in a state in which the raceway surface is subjected to the burnishing, and
a third curve indicating a static shear stress in the depth direction of the raceway surface in a state in which rolling elements are in contact with the raceway surface and a static load is applied to the raceway surface; and
when a region surrounded by exceeding the first curve and the second curve and falling below the third curve is defined as an area A, and a region surrounded by exceeding the first curve and falling below the third curve is defined as an area S, selecting machining conditions satisfying the area A<the area S.

7. The method for selecting burnishing conditions according to claim 6,
wherein the burnishing is performed by using a burnishing tool of which a tip is mounted with a burnishing ball, and
when a value obtained by dividing a radius of the burnishing ball by a groove radius of the bearing raceway ring is defined as a burnishing ball selection index B, B≤1.

8. The method for selecting burnishing conditions according to claim 7,
wherein a correlation is obtained between a burnishing indentation resistance index α, which is expressed by (the area S−the area A)/the area S", and the burnishing ball selection index B.

9. The method for selecting burnishing conditions according to claim 8,
wherein based on the correlation between the burnishing indentation resistance index a and the burnishing ball selection index B, a size and a material of the burnishing ball and a burnishing load are determined, so that the burnishing indentation resistance index a is maximized.

10. The method for selecting burnishing conditions according to claim 7,
wherein a material having a Young's modulus of 200 GPa or more is selected as the burnishing ball.

11. A bearing manufacturing method comprising:
a burnishing step using the burnishing conditions selected by the method for selecting burnishing conditions according to claim 6.

* * * * *